United States Patent
Nilsson et al.

(10) Patent No.: US 7,811,487 B2
(45) Date of Patent: Oct. 12, 2010

(54) METHOD FOR PRODUCING A SINTERED BODY

(75) Inventors: Björn Nilsson, Kimstad (SE); Lars Graffton, Bettna (SE); Leif Båskman, Norrköping (SE)

(73) Assignee: PAKIT International Trading Company Inc, Upton, St. Michael (BB)

( * ) Notice: Subject to any disclaimer, the term of this patent is extended or adjusted under 35 U.S.C. 154(b) by 462 days.

(21) Appl. No.: 11/719,783

(22) PCT Filed: Nov. 25, 2005

(86) PCT No.: PCT/SE2005/001773

§ 371 (c)(1),
(2), (4) Date: Jul. 9, 2007

(87) PCT Pub. No.: WO2006/057611

PCT Pub. Date: Jun. 1, 2006

(65) Prior Publication Data

US 2009/0140459 A1    Jun. 4, 2009

(30) Foreign Application Priority Data

Nov. 26, 2004    (SE) .................................... 0402898

(51) Int. Cl.
*B29C 65/00*    (2006.01)

(52) U.S. Cl. .................... 264/44; 264/43; 264/112; 264/113; 264/124; 264/125; 264/255

(58) Field of Classification Search ............ 264/43, 264/113, 44
See application file for complete search history.

(56) References Cited

U.S. PATENT DOCUMENTS

| 2,241,095 | A | * | 5/1941 | Marvin .................... 427/191 |
| 2,267,918 | A | | 12/1941 | Hildabolt |
| 3,811,976 | A | * | 5/1974 | Schlomer et al. ........ 156/62.8 |
| 3,885,005 | A | * | 5/1975 | Downing et al. .......... 264/28 |
| 5,864,743 | A | * | 1/1999 | Tuchinskiy et al. ....... 419/2 |
| 6,436,163 | B1 | * | 8/2002 | Geibel et al. ............ 55/523 |

FOREIGN PATENT DOCUMENTS

EP    0559490 A1    9/1993
JP    06031710 A  *  2/1994

OTHER PUBLICATIONS

Communication Pursuant to Article 94(3) EPC dated Oct. 22, 2009.

* cited by examiner

*Primary Examiner*—Philip C Tucker
*Assistant Examiner*—Amjad Abraham
(74) *Attorney, Agent, or Firm*—King & Spalding LLP

(57) ABSTRACT

This invention relates to a method for forming a three dimensional sintered body (100) comprising the steps of a) providing a basic mould having a configuration adapted to the sintering body that is to be produced, b) treating the surface of the basic mould to facilitate application of a first surface layer (130) of the sintered body (100), c) applying powder particles (131) onto the basic mould, to form said first surface layer (130), d) applying at least one more layer (120) on top of said first surface layer (130), e) heat treating the basic mould (400) and the particles to form a sintered body, wherein step b) is performed by providing an adhering (604) to the basic mould arranged to adhere the particles (131) of at least a portion of the surface layer (130).

18 Claims, 9 Drawing Sheets

Fig. 7
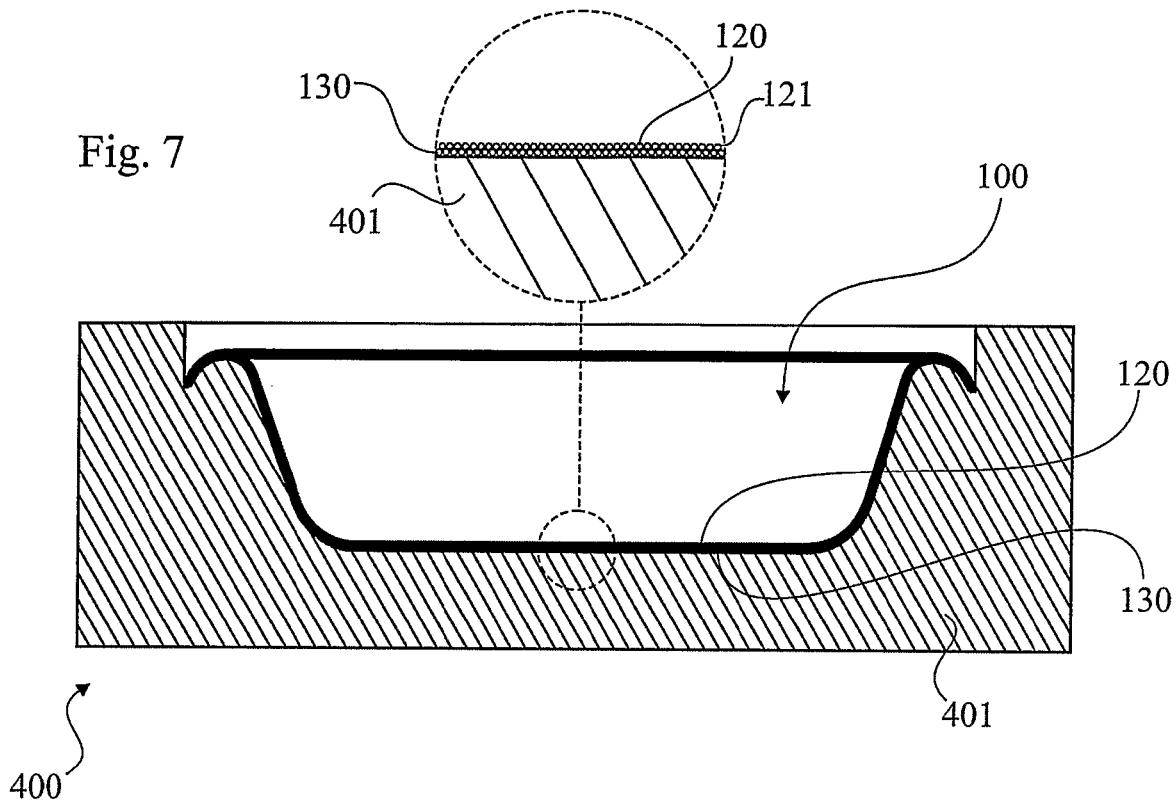
Fig. 8
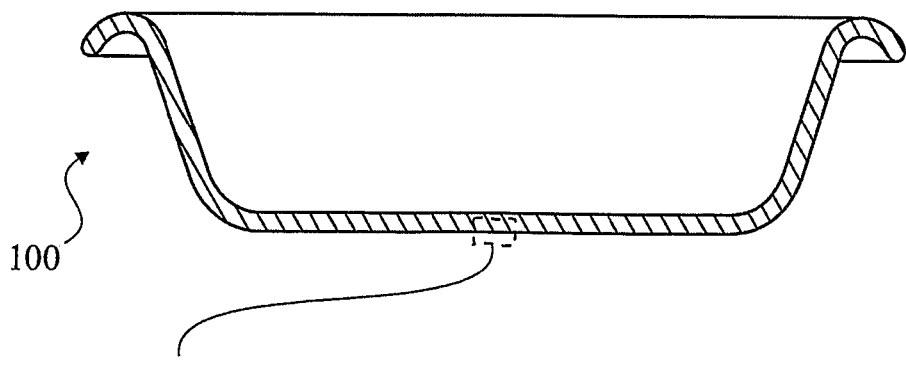
Fig. 9

US 7,811,487 B2

METHOD FOR PRODUCING A SINTERED BODY

PRIORITY DOCUMENTS

This application is a section 371 of and claims priority to international application PCT/SE05/01773 filed on Nov. 25, 2005, which designated the United States and which was published in the English language on Jun. 1, 2006 as WO 2006/057611 A1 and claims the benefit of Sweden SE 04028989-1, filed Nov. 26, 2004. The entire contents of each of the foregoing related applications are hereby incorporated herein by reference.

TECHNICAL FIELD

The present invention relates to a method for forming a three dimensional sintered body comprising the steps of:
 a) providing a basic mould having a configuration adapted to the sintering body that is to be produced,
 b) treating the surface of the basic mould to facilitate application of a first surface layer of the sintered body,
 c) applying powder particles onto the basic mould, to form said first surface layer,
 d) applying at least one more layer on top of said first surface layer,
 e) heat treating the basic mould and the particles to form a sintered body.

BACKGROUND OF THE INVENTION

Production of three dimensional sintered bodies is traditionally a complex and costly process, e.g. porous bodies. Porous bodies are used for many different technical applications in filtration of gases and liquids, fluidising processes, separation and catalysing. One important application is in filtration of pulps. The shape of the porous body or mould is in the latter case quite complicated. However, the shape of filters for gases and liquids is commonly quite simple due to the inherent manufacturing problems in producing porous bodies having a more complex configuration. Furthermore the production series may be of relative small size, why a low production cost of the mould is an advantage, as also fast and cost effective way of manufacturing it. Another aspect is the internal structure of such products, e.g. drainage properties.

There are some key properties of a filter that have large importance on the requested functionality at the filtering operation. Two of these properties, i.e. high yield at the filtering operation and low pressure drop over the filter, are very often contradictory. High yield of the substance to be taken away by the filtering operation e.g. fibres in a pulp is achieved by using a filter with a fine porous structure. A fine porous structure means in this case that the channels formed by the pores are small in size. However, the pressure drop over the filter increases with decreasing size of the pore channels. On the other hand as mentioned above, a fine structure is often desired to obtain high yield and some times also to facilitate providing a body having a smooth surface structure.

It is well known that a fine pore structure can be achieved by manufacturing the porous body from fine particles or fibres and obviously a coarse pore structure by using coarse particles or fibres in the manufacturing process of the filter.

One rather recent method for producing three-dimensional objects, e.g. to provide filters with a graduated structure, is the WPS-process (Wet Powder Spraying Process). In this process a mixture containing sinter able powder is sprayed on to a supporting body, where after the binding agent of the mixture is decomposed in a first step and the actual sintering is performed in a second step. In US 2004/0050773 there is presented such a process intended for the production of at least two layers of different pore size.

From US 2002/0195188 there is known a similar but somewhat modified process wherein the mixture contains pore forming material containing particles with predetermined size or size distribution. Further, there is also known a process wherein centrifugal forces are used to obtain a graduated structure of a three-dimensional sintered body. As is evident, all of these processes need sophisticated arrangements/apparatuses to achieve a desired result, which leads to a relatively high cost of the final product.

From EP0559490 and EP0559491 there is known a further process for producing a three dimensional body, e.g. a pulp moulding die, preferably comprising glass beads to form a porous structure is presented, which also mentions that sintered particles can be used. The production technology described therein is however complicated.

SUMMARY OF THE INVENTION

It is an object of the invention to provide a method for forming a three dimensional sintered body comprising the steps of:
 a) providing a basic mould having a configuration adapted to the sintering body that is to be produced,
 b) treating the surface of the basic mould to facilitate application of a first surface layer of the sintered body,
 c) applying powder particles onto the basic mould, to form said first surface layer,
 d) applying at least one more layer on top of said first surface layer,
 e) heat treating the basic mould and the particles to form a sintered body wherein step b) is performed by providing an adhering layer to the basic mould arranged to adhere the particles of the surface layer.

Thanks to the invention there is provided a method that substantially improves the efficiency for producing a three-dimensional sintered body. Further the present invention provides for the manufacture of a filter having a thin surface layer with fine pore structure and an inner core with coarse pore structure. Hereby is a filter obtained with efficient filtering capability and excellent drainage properties, primarily low pressure-drop during the filtering operations.

According to further aspects of the invention:
 said adhering layer, is applied as a liquid, which preferably is applied to the basic mould by means of spraying, which provides for a surprisingly efficient process of performing a method according to the invention.
 said liquid substantially comprises water, which preferably is applied to the basic mould by means of spraying, which provides for an especially cost-effective and environmental friendly manner of performing a method according to the invention, and which not least advantageous provides a method where the binder may easily be removed (evaporation) without leaving any rest products.
 at least a portion of said adhering layer is arranged to melt by means of heat supplied from said powder particles, which provides for a surprisingly efficient process of performing a method according to the invention.
 prior to step b) the basic mould has been treated to obtain a temperature of between 0° C.--100° C., preferably in the range of −10° C.--30° C., which is an easy way of providing beneficial conditions for performing a method according to the invention.

step c) is performed in a room having a temperature above +10° C. and below 60° C., preferably between 15-35° C., and more preferred at room temperature between 18-28° C., which for beneficial conditions for performing a method according to the invention and also for individuals involved in it.

at least one layer and/or at least one portion comprises particles of different size than the particles in other parts of said body, wherein preferably at least one layer and/or one portion comprises particles of larger size than the particles in said surface layer, which provides for en efficient manner of tailoring different properties of a porous body.

at least one further layer is applied in the same manner on top of said surface layer, which provides for the advantage that more exact tailoring may be achieved concerning properties of a porous body.

at least one layer comprises powder particles.

the basic mould is substantially filled prior to step e), which provides an efficient manner of producing a voluminous body, e.g. needing a flat supporting surface.

at last one channel is provided in the body by applying a solid device that is removed from the body after step d), which is an efficient manner of producing bodies provided with customised properties concerning drainage, etc.

step b) is also applied to surfaces of the basic mould adapted for substantially non-permeable areas of the body, which for some products provides a very cost-efficient manner of production.

Further aspects and advantages of the method may be found in the description.

BRIEF DESCRIPTION OF THE DRAWINGS

In the following the invention will be described in relation to the appended figures, wherein:

FIG. 7 shows the final product, FIG. 8 shows a different kind of product produced along the same lines as described in relation to FIGS. 1-6.

DETAILED DESCRIPTION

Figure 1:
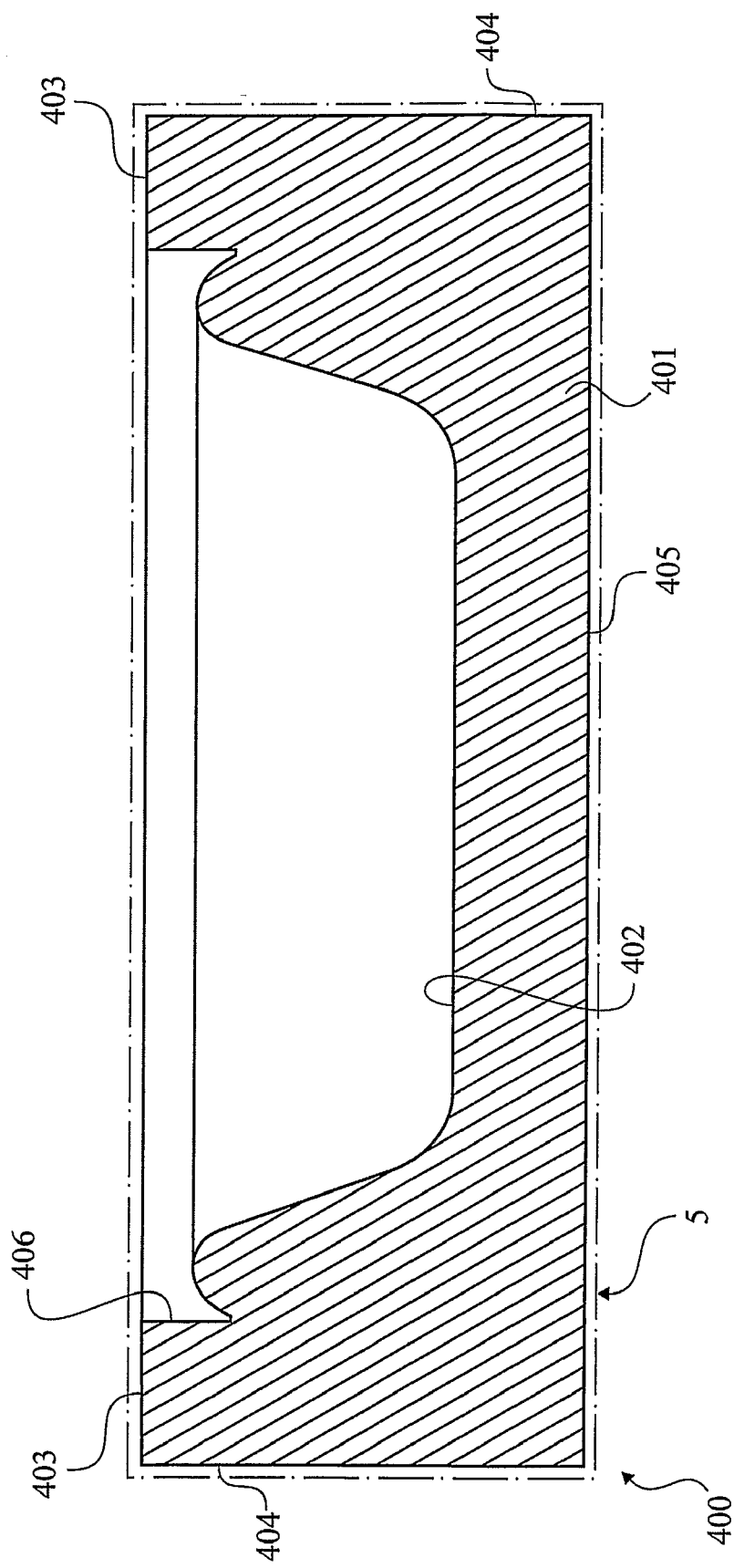
FIG. 1 shows a cross sectional side view of the basic mould according to one embodiment of the invention.

In FIG. 1 there is shown a basic mould half 400 for a producing a product 100 (see FIG. 7) according to the invention, e.g. a filter body. The basic mould 400 comprises a body 401, having a bottom wall 405, side wall 404 and a top surface 403, into which formed surfaces 402, 406 have been made. The basic mould may be made of e.g. synthetic graphite or stainless steel. The use of graphite provides a certain advantage in some cases, since it is extremely form stable in varying temperature ranges, i.e. heat expansion is very limited. On the other hand stainless steel may be preferred in other cases, i.e. depending on the configuration of the product, since stainless steel has a heat expansion that is similar to the heat expansion of some sintered body (e.g. if mainly comprising bronze) such that during the cooling (after sintering) the sintered body and the basic mould contracts substantially equally.

In the basic mould 400 there is formed a moulding face 402 that corresponds to the surface layer 130 of the product 100 to be sintered and also non-forming surfaces 406. The moulding face 402 may be produced in many different ways known in the art, e.g. by the use of conventional machining techniques. For some products a very smooth surface is desired and then the finish of the surface of the moulding face 402 should preferably be of high quality.

However, the precision, i.e. exact measurement, must not always be extremely high, since an advantage with the invention is that high quality properties of some products may be achieved even if moderate tolerances are used for the configuration of the basic mould, e.g. filter bodies where e.g. drainage properties may be more or less independent of the surface or pulp moulds where heat pressing may improve the surfaces of the moulded object pulp moulds. For moulded pulp objects the first heat pressing action (when producing a moulded pulp product according to a preferred mode, see FIGS. 8 and 9), creates a kind of impulse impact within the fibre material trapped in the void 300 between the two mould halves 100, 200, that forces the free liquid out of the web in a homogeneous manner, despite possible variations of web thickness, which as a result provides a substantially even moisture content within the whole web. Hence it is possible to produce the basic moulds with tolerances that allow extremely cost efficient machining in some instances.

In FIGS. 2-6 the consecutive production of a product according to the invention is shown.

Figure 2:
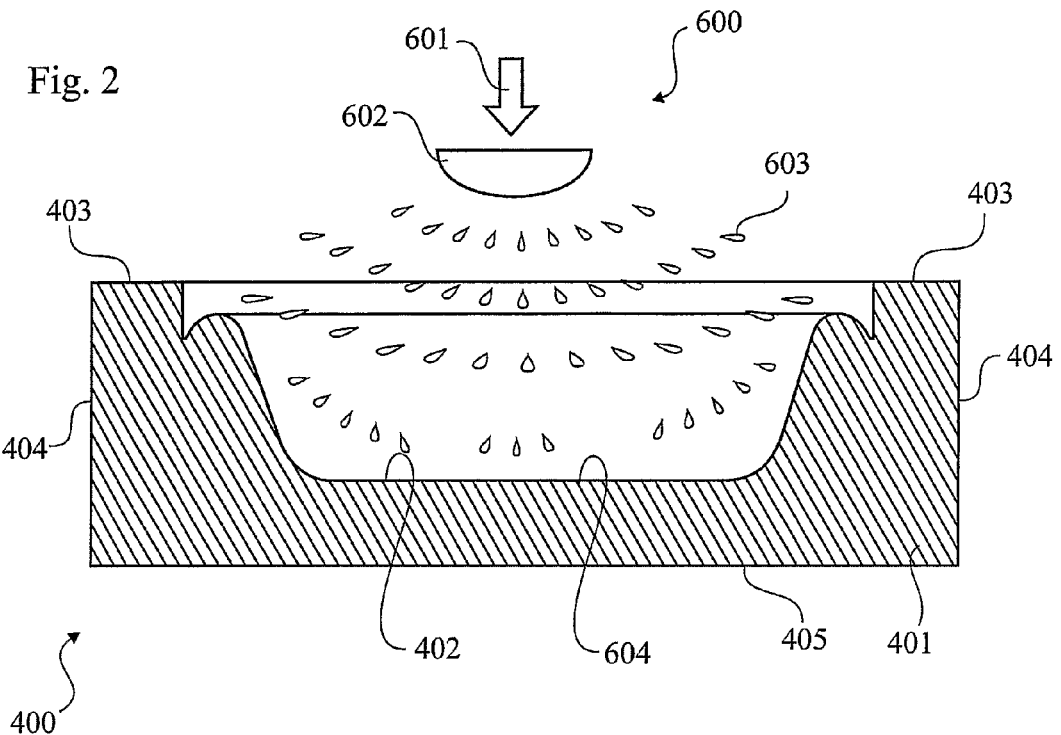
FIG. 2 shows a basic mould of FIG. 1 in a subsequent step for the production of a product according to the invention.

In FIG. 2 it is shown that the basic mould 400 is applied with a thin layer of ice 604. This is preferably achieved by first having the basic mould 4 in a freezer 5 (as schematically indicated in FIG. 1), e.g. at −18° C., to reduce the temperature of the basic mould 400 to well below the freezing point of water. Once the desired temperature of the basic mould 400 is obtained the production of the actual pulp mould may be started. The basic mould 400 is then taken out of the freezer 5 and may thereafter be worked with. This may for instance be achieved by having the freezer 5 positioned within the working area having room temperature, i.e. allowing workers having a comfortable temperature, e.g. ambient temperature of about 18-28° C.

Thereafter, as shown in FIG. 2, a thin layer of the water 604 is sprayed onto the basic mould 400. The water will freeze and form a thin ice layer 604 on the basic mould 400. The water 601 is (as shown schematically) is supplied to a spray means 600 having a spray head 602 provided with means for producing finely divided droplets 603, e.g. a kind of shower head arranged with numerous small outlets. The spray device 600 is directed to cover the formed surface 402 of the mould 400. Hence a thin layer of ice 604 will be formed on top of the product forming surface 402 of the basic mould 400.

Figure 3:
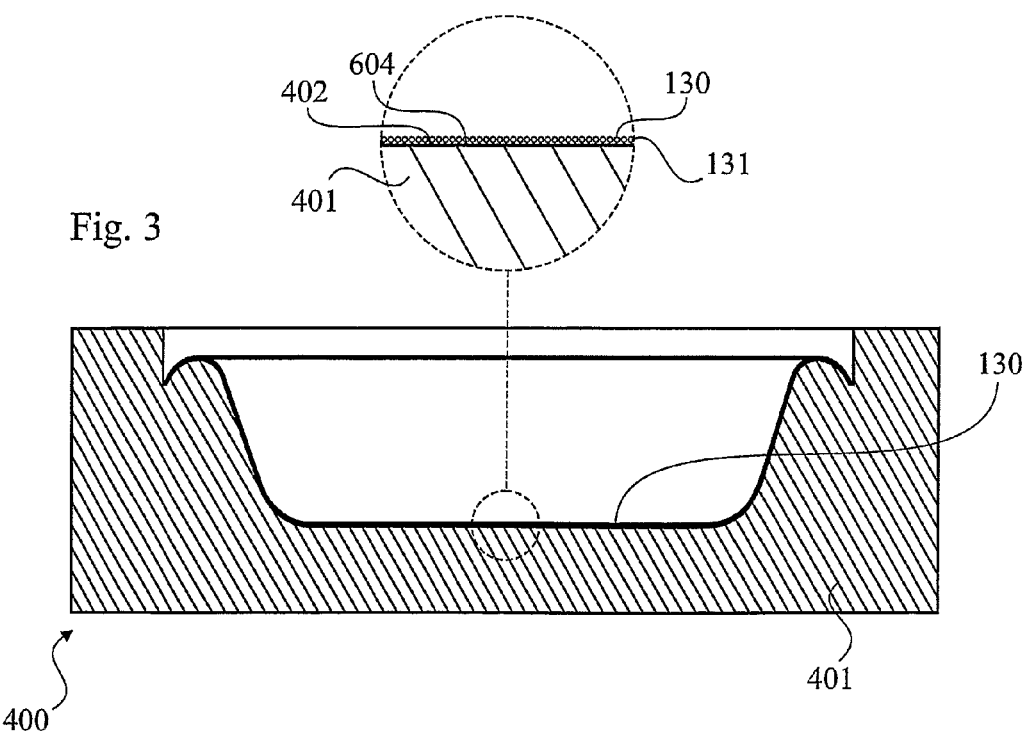
FIG. 3 shows a subsequent step in relation to FIG. 2.

In the next step, as shown in FIG. 3, the first layer 130 of particles 131 will be formed. This is achieved by applying the fine particles 131, having room temperature, into the basic mould 400 onto the formed surfaces 402. Thereafter the basic mould 400 is moved around to allow the excessive amount of particles 131 to come into contact with each part of the surface 402 of the mould 400, such that an even, thin layer 130 is applied. The mechanism behind this efficient method is that the warm particles 131 (having room temperature), coming in contact with the layer 604, will melt some ice during its initial contact and thereafter quickly adopt the temperature of the basic mould 400. The melted ice will then re-freeze and binds the particles 131 to the thin ice layer 604. Accordingly this is a very efficient way of establishing an even first layer 130 of particles 131 in the basic mould 400. (It is evident for the skilled person that this principle may also be used in connection with other liquids having formed a thin layer in the basic mould 400, e.g. wax but then of course a higher temperature of the particles may be needed to assure sufficient adhering).

Figure 4:
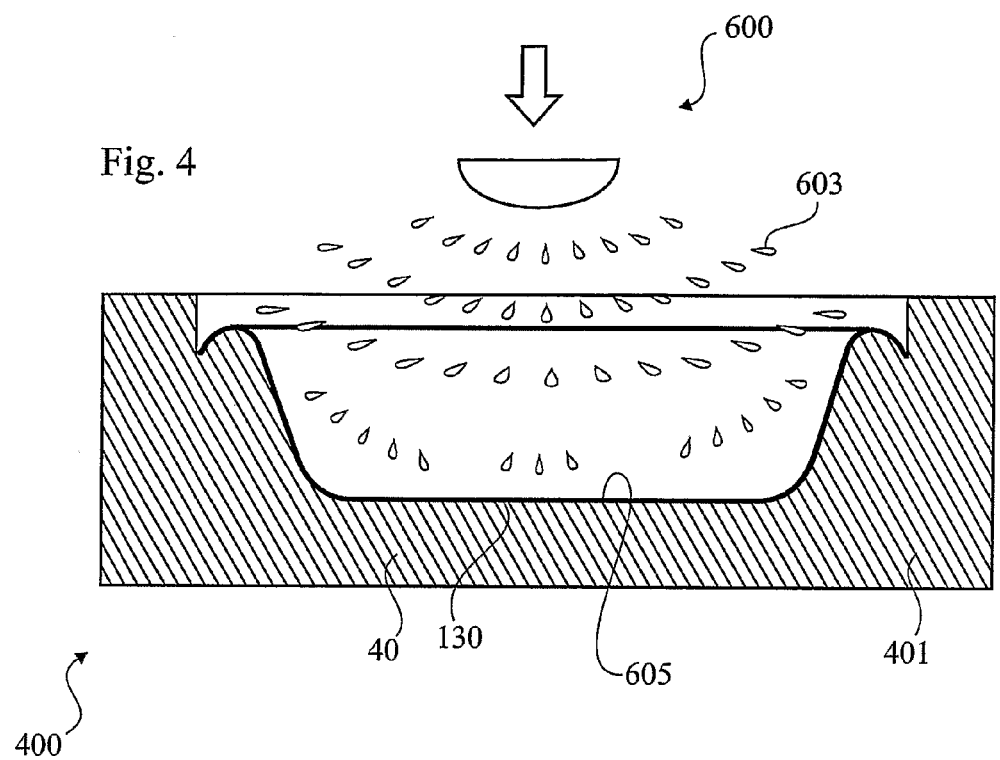
FIG. 4 shows a subsequent step in relation to FIG. 3.
Figure 5:
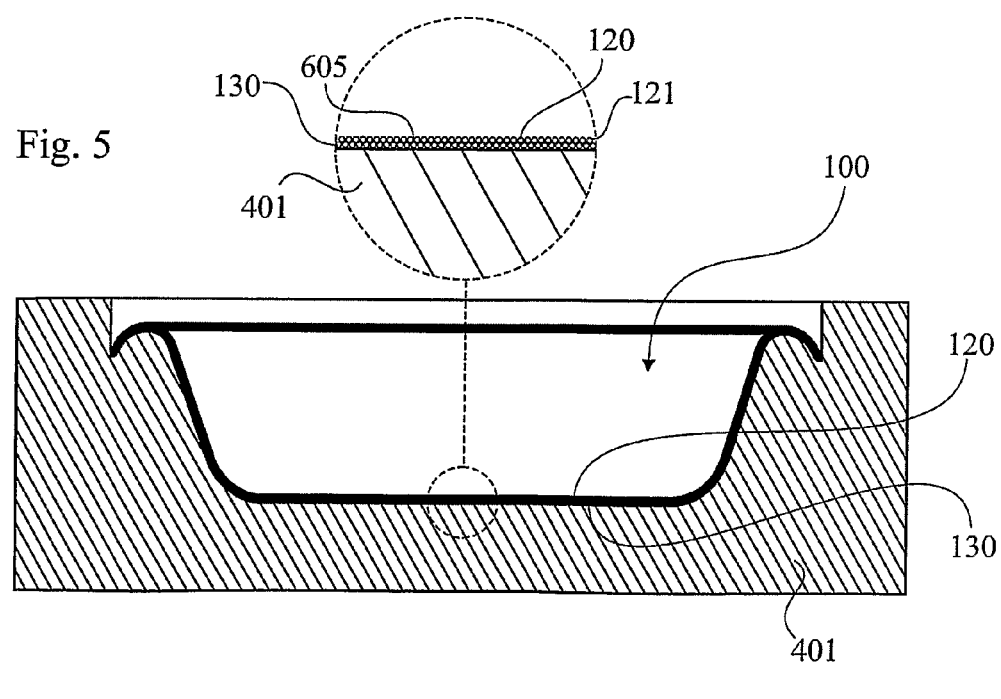
FIG. 5 shows a subsequent step in relation to FIG. 4.

Thereafter the mould 400 may again be put into the freezer 5 (if necessary to re-cool it) and subsequently taken out thereof to apply a further layer of ice 605, as shown in FIG. 4. Accordingly this second layer of ice 605 is applied in exactly the same way as described in connection with FIG. 2, but on top on the surface layer 130 of fine particles 131. Once the desired ice layer 605 has established the procedure of applying fine particles 121 is also repeated. Accordingly an excessive amount of further particles 121 forming a second layer 120 on top of the first layer 130 is supplied. As can be seen in FIG. 5 the basic mould 400 after two subsequent steps will present double layers 130, 120 of fine particles 131, 121 fixed to the inner surface 402 of the basic mould 400 by means of ice.

Figure 6:
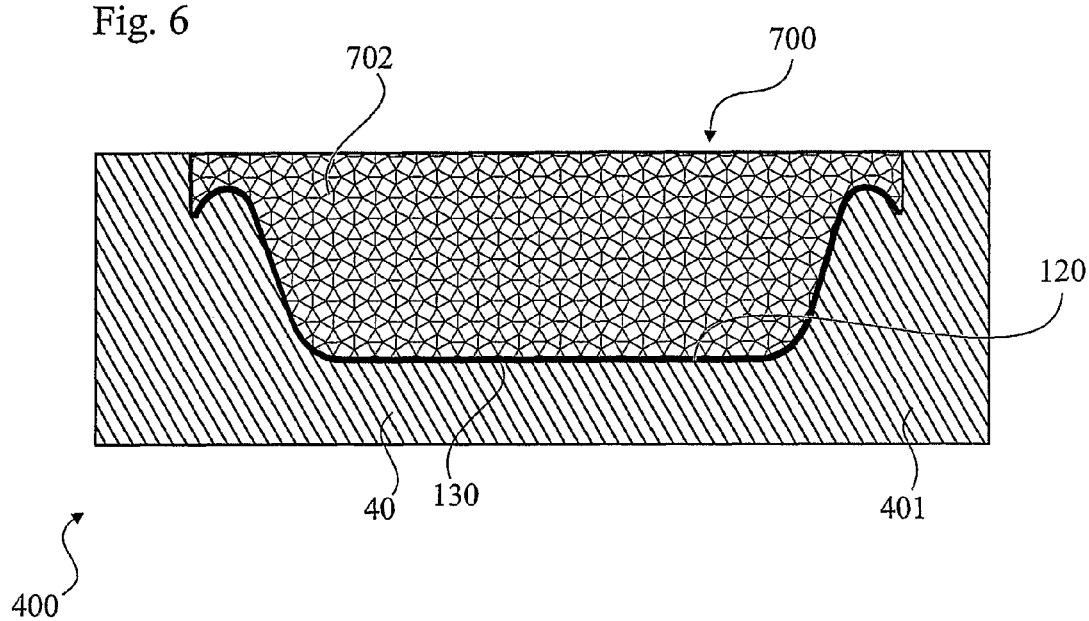
FIG. 6 shows a subsequent step in relation to FIG. 5.

In the next step a holding device 700 is applied on top of the fixed layers 120, 130, in order to hold the established layers 120, 130 in place during the final sintering stage. In FIG. 6 the holding device 700 comprises some kind of powder material 702 that will not interact during the sintering process, e.g. sand or other inert particles.

Figure 6A:
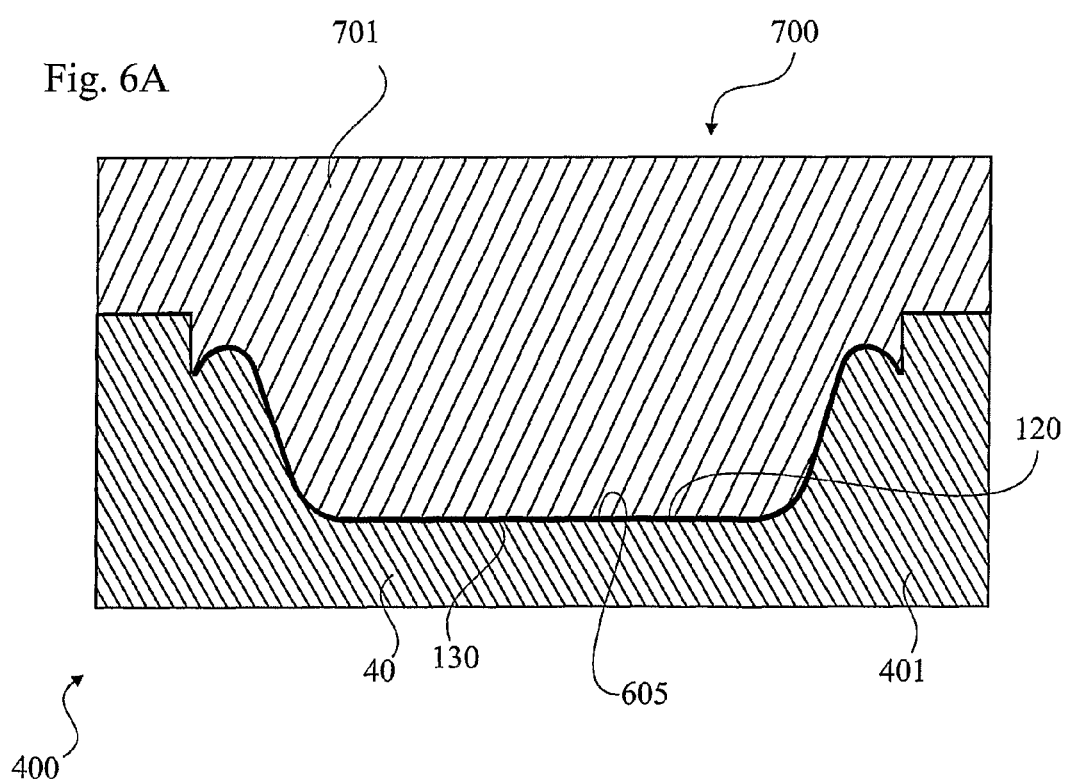
FIG. 6a shows a modified manner of performing the step shown in FIG. 6.

In FIG. 6A there is shown alternate method to hold the established layers 120, 130 in place, i.e. by applying a male mould 701 provided with a sufficient space for the layers 120, 130 to fill the void between the mould 400 and the male device 701.

Thereafter the final step when producing a product 100 according to the invention is achieved by sintering (as known per se) the layers 120, 130, in a sintering furnace (not shown) containing an appropriate atmosphere, e.g. $H_2$, $H_2+N_2$ or vacuum. For example, if mainly particles of copper-based alloys are used the sintering temperature may be 800-1000° C., and about 1100-1300° C. if stainless steel particles are used, combined with a sintering time of 0.5-2 hours.

During the sintering process, at elevated temperature, the water in the ice layers 604, 605 will melt and evaporate, leaving no rest products and merely creating gases in the form of evaporated steam. Hence the use of water/ice provides a very environmental friendly method and also a method that eliminates possible problems related to rest products (as is known in connection with other methods where different kind of binders are used). As is evident the holding device 700 during this process merely fixes the adhered layers 120, 130 in their intended positions during the sintering process. Hence normally the holding device 701 will not exert any pressure onto the layers 120, 130 during the sintering process. However, it is obvious that in connection with production of some specific filters it may be desire to achieve some degree of compaction prior to or during the sintering process, which accordingly may be achieved when using a solid holding device 701 as shown in FIG. 6A.

After cooling, the sintered body 100 is taken out of the basic mould 400 and is now in principle ready for use, e.g. as a filter body. As can be seen in FIG. 7 the exemplary filter 100 produced may be made to be extremely thin, which in some instances can be desired.

However, as indicated by way of example in FIG. 8 a filter body is rarely needed to be as extremely thin as shown in FIG. 5, but normally the thickness is at least 2 mm. Considering the fact that particles in the range of between 0.2-200 μm may be used according to the invention, it is realised that normally at least one layer 120 containing at least four levels of coarse particles is applied on top of a fine surface layer 130.

Figure 9:
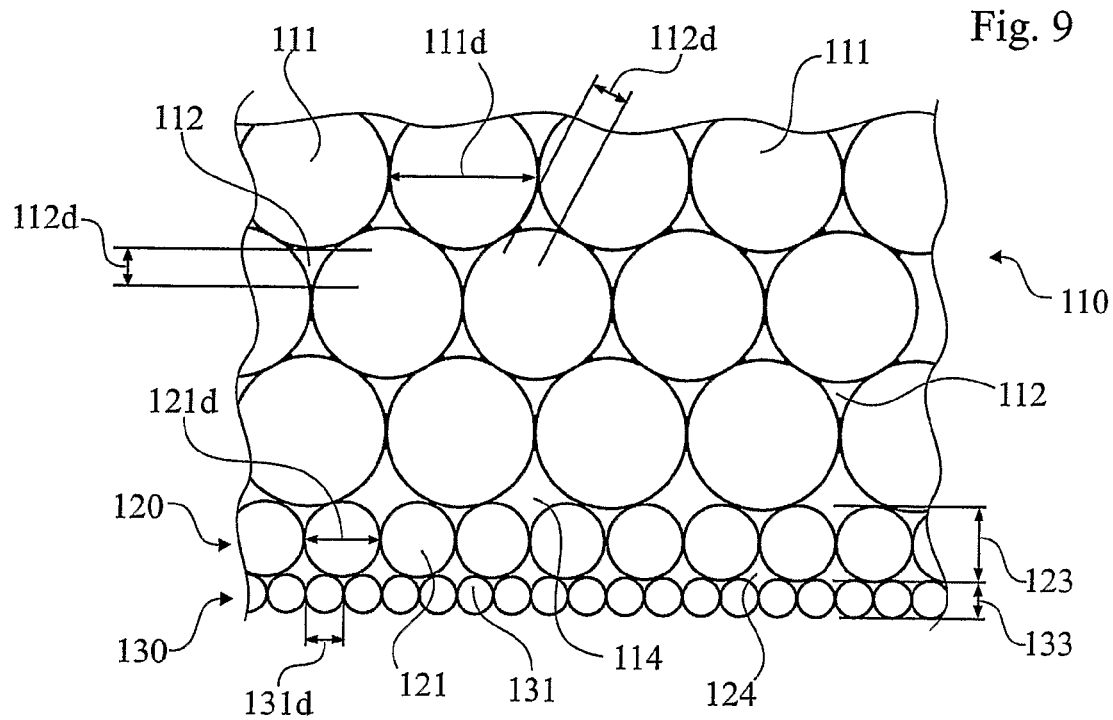
FIG. 9 is a cross sectional zooming of the embodiment shown in FIG. 8 showing the internal porous structure.

FIG. 9 is a cross sectional zooming of FIG. 8 showing the surface layer 130, a first support layer 120, and basic support structure 110. As can be seen from the figure the surface layer 130 comprises sintered particles 131, having an average diameter 131d, provided in one thin layer. The thickness of the surface layer 130 is denoted by 133 and since it comprises one layer of particles 131 the thickness 133 of the surface layer 130 is equal to the average diameter 131d, e.g. powder particles with an average diameter 131d between 0.09-0.18 mm.

As can be seen from FIG. 9 the first support layer 120 comprises sintered particles 121, having an average diameter 121d. The thickness of the support layer is denoted by 123 and since it comprises one layer of particles, the thickness 123 is equal to the average diameter 121d, e.g. in the range 0.18-0.25 mm. In other words 121d is about twice 131d Generally it is preferred that 3×131d>121d>1.5×131d. The first support layer 120 may of course be omitted, especially if the size difference between the sintered particles 111 of the base structure 110 and the sintered particles 131 of the surface layer 130, is small enough, i.e. the function of the first support layer 120 may sometimes merely be to increase the strength of the mould, i.e. to safeguard that the surface layer 130 does not collapse into voids 114, 124. If the size difference between the sintered particles 111 of the base structure 110 and the sintered particles 131 of the surface layer 130 is very large, numerous support layers may be used where the size of the sintered particles gradually is increased in order to improve strength, i.e. to prevent structural collapse due to the voids between the layers.

The base structure 110 of the embodiment shown in FIG. 9, e.g. contains spherical metal powder with a particle size range between 0.71-1.00 mm, implying a theoretical pore size of about 200 μm and a filter threshold of about 100 μm. The pores 112 of the base structure 110 in FIG. 7 thus have a theoretical pore size 112d of 200 μm, enabling liquid and/or gas/vapour to be evacuated through the pore structure.

As understood by the above and the following, the invention, e.g. by use of the same basic mould 400 to form the same outer configuration, enables production of porous bodies 100 having tailored properties in relation to different parameters, e.g. drainage by varying size and/or shape of the particles and/or temperature conductivity by varying the material of the particles and/or corrosion resistance by varying the material of the particles.

Figure 10:
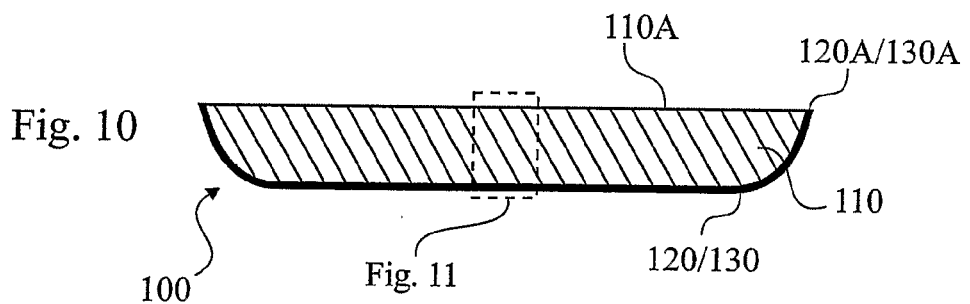
FIG. 10 shows an exemplary different kind of body produced in a similar mould as shown in FIGS. 1-6.

In FIG. 10 there is shown a different kind of body that may be produced in a basic mould 400 shown and describe above. Here, as is understood when studying the cross sectional zooming of FIG. 11, there are positioned a first surface layer 130 and a second layer 120 as described above (In FIG. 10 these two layers have been schematically indicated as a common layer 120/130). Contrary to what is shown in e.g. FIG. 5 the edge 120/130A of these two layers 120/130 merely extends a limited distance of the entire height of the basic mould 400. Hence once the two layers 120/130 have been established there is formed a kind of trough shape void inside thereof. Within this trough shaped void a further amount of particles 111 are supplied, to form the upper portion 110 of the body 100. As is evident these particles 111 may be chosen to have any kind of desired diameters/configuration in order to provide desired properties. Generally numerous layers of particles will be used to form this portion 110 of the body 100. An important advantage when producing a body 100 according to this embodiment is that there is no need for any holding device/body 700, since the particles 111 will provide sufficient support to hold the established layer 120, 130 in position during the sintering process.

Figure 12:
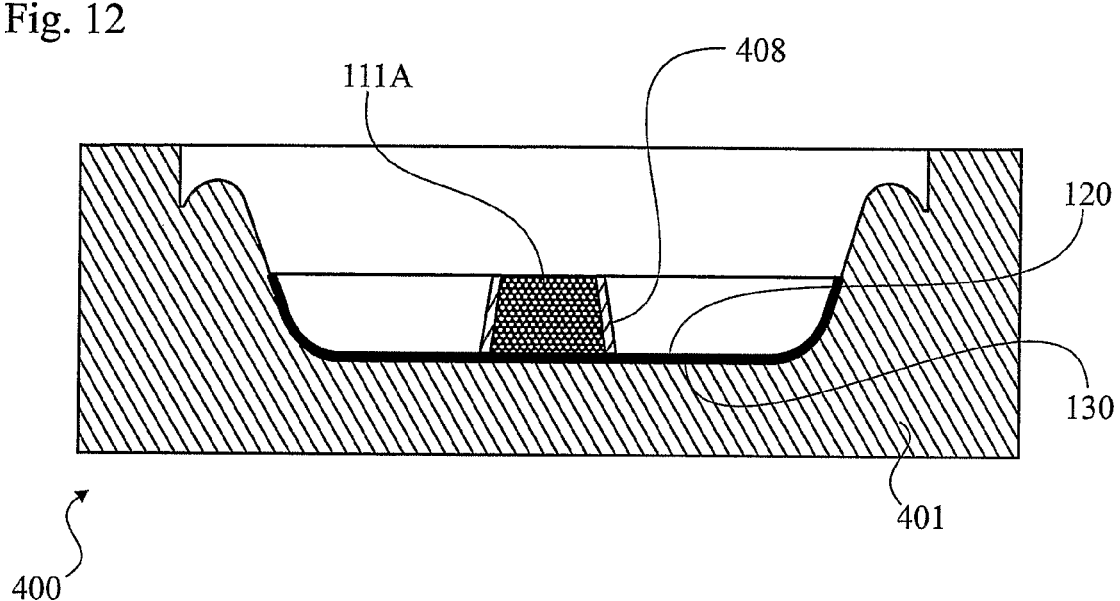
FIG. 12 shows an exemplary further embodiment of performing the method according to the invention.
Figure 13:
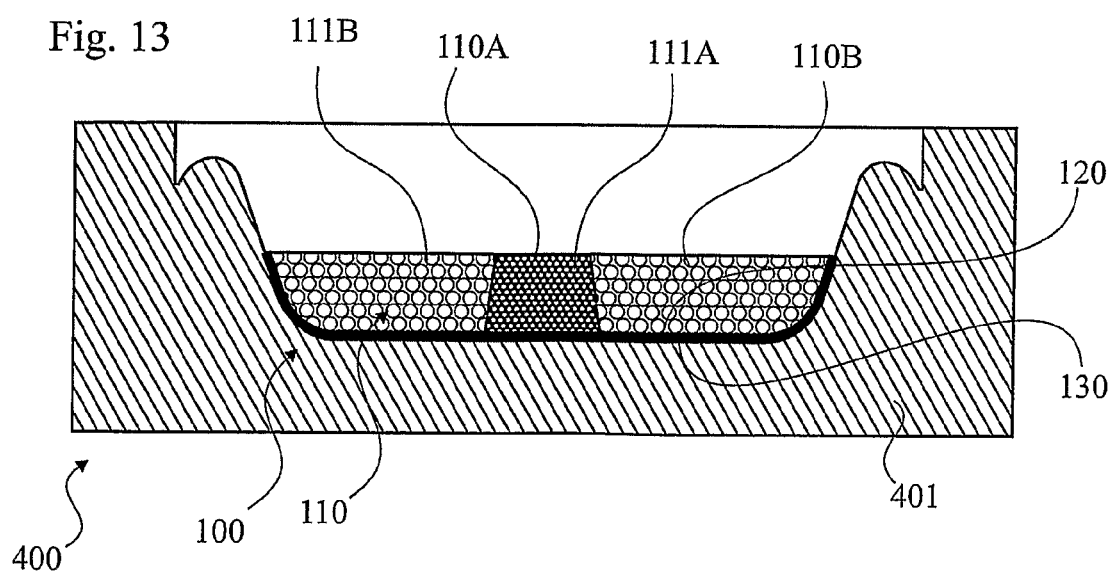
FIG. 13 is a subsequent step in relation to FIG. 12.

In FIGS. 12 and 13 there is shown a further modification according to the invention, where a body 100 is formed having a similar outer configuration as shown in FIG. 10, but with different properties within the upper portion 110 thereof, by forming a centre portion 110C comprising a first kind of particles 111A and a peripheral portion 110B comprising differently sized particles 111B. Such a body may be achieved along the following lines. The first two layers 120, 130 may be established in accordance with the above method steps. Thereafter a cylindrical, hollow body 408 (preferably slightly tapered) is positioned on top of the upper layer 120. In the next step particles 111A are supplied into the void within the cylindrical body 408. Thereafter water is sprayed onto the particles 111A and the basic mould 400 put into the freezer 5 thereby fixing the particles 111A corresponding to the configuration of the cylindrical body 408. In a subsequent step the basic mould 400 is taken out of the freezer 5 and the cylindrical body 408 removed where after further particles (of different desired, shape/material) 111B are supplied into the existing void within the remaining part of the space defined by the layers 120, 130. In a final subsequent step the sintering is performed to produce the desired filter body 100. Hence it is evident that a method according to the invention may be used in a very flexible manner to achieve porous bodies 100 having very varying properties.

In the following it will be described that the invention in an efficient manner also enables manufacture of even more complex filter bodies, by describing a pulp mould produced in accordance with the invention.

Figure 14:
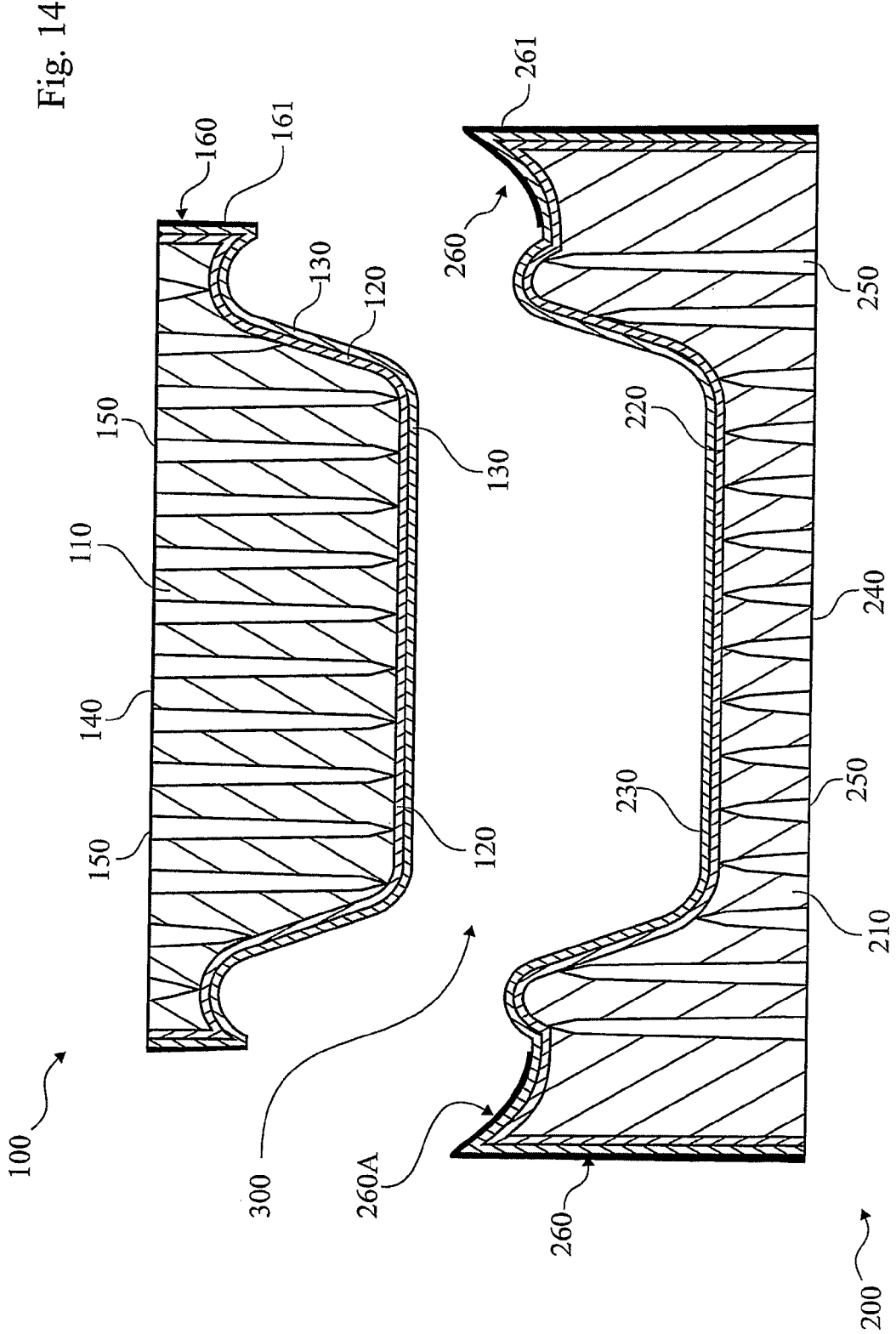
FIG. 14 shows a cross sectional view of a male part and complementary female part of another kind of porous body produced according to the invention, i.e. a pulp mould.

FIG. 14 shows a cross-sectional view of more complex filter bodies (produced according to the invention), i.e. a male 100 and a complementary female 200 part of a pulp mould, to high-light some further advantages for products manufactured according to the invention. By way of example the same kind of outer configuration is used as for the products described above, i.e. the same basic mould 400 is used for producing the male pulp mould 100.

A major difference for a product according to FIG. 14, compared to the products shown in FIGS. 1-13 is that here channels 150, 250 are formed and the basic mould 400 is filled up in level with its upper surface 403, prior to the sintering. (the female 200 and the male 100 part are constructed according to the same principles). A forming space 300 (see FIG. 15) is arranged between the pulp moulds 100, 200, where the moulded pulp is formed during operation.) A base structure 110, 210 constitutes the main support structure of the bodies 100, 200. A support layer 120, 220 is arranged between the base structure 110, 210 and the surface layer 130, 230. It is advantageous that the pulp moulds 100, 200 have good heat conductive properties in order to transfer heat to the surface layers 130, 230, which is easily achieved by means of the invention since the particles/powder used may be flexibly varied to fulfil specific needs that are beneficial for that kind of product produced as also mentioned above. Moreover, for a pulp mould, it is advantageous that the base structure 110, 210 is a stable structure being able to withstand high pressure (both applied pressure via the bottom 140, 240 and pressure caused by steam formation within the mould) without deforming or collapsing and at the same time having throughput properties for liquid and vapour. It is therefore advantageous that the pulp mould has a total porosity of at least 10% but to be able to withstand the operating pressure it is advantageous that the total porosity is less than 35%.

Figure 15:
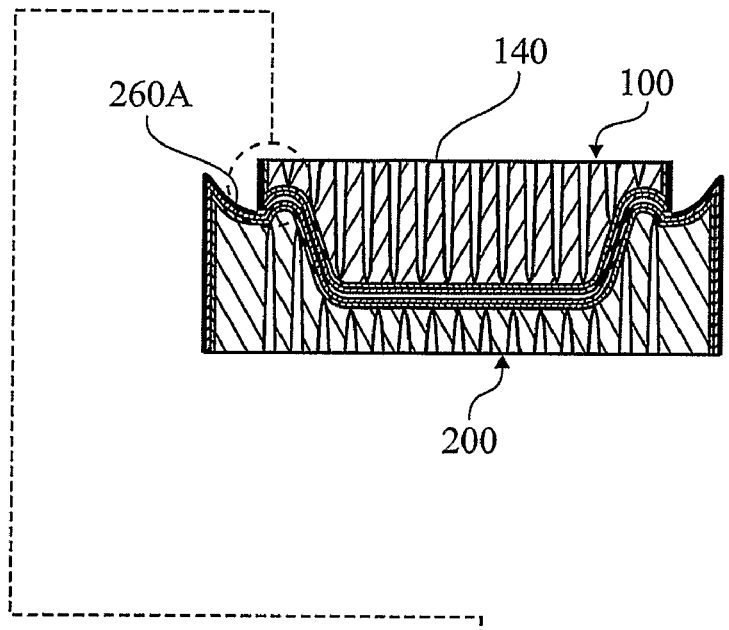
FIG. 15 shows the same as FIG. 14 but in an a moulding position.
Figure 16:
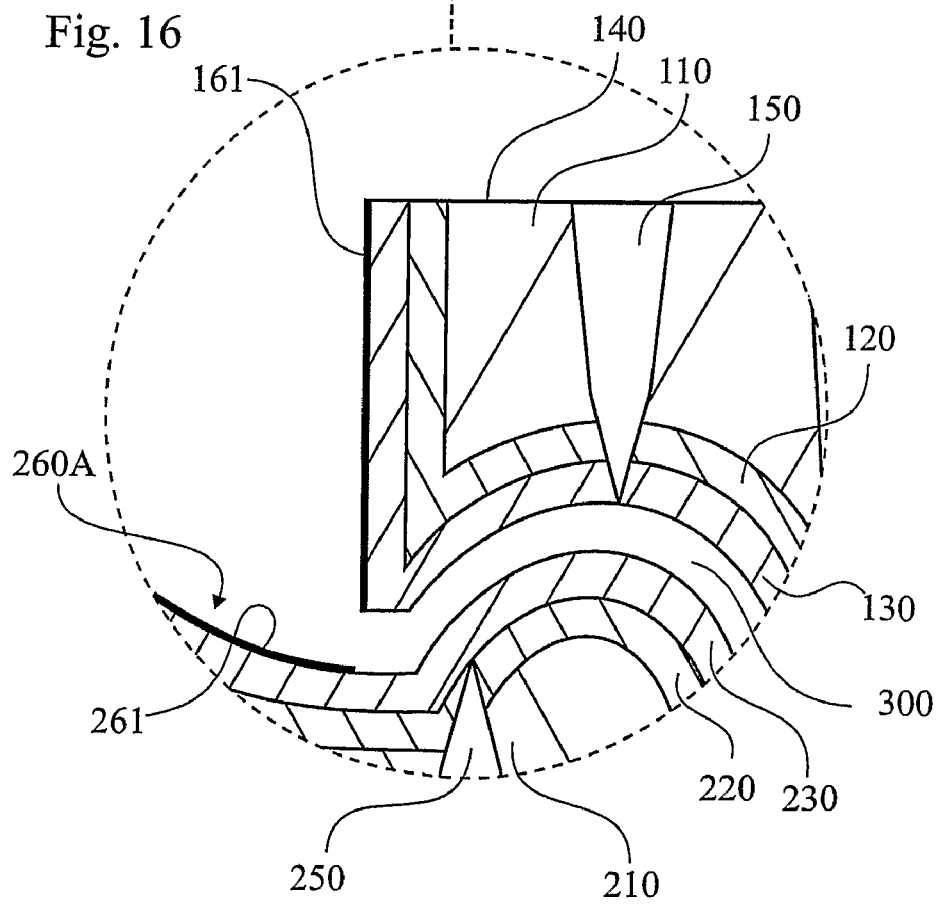
FIG. 16 shows a zooming of a part of FIG. 15.

As is evident from FIGS. 14-16 the drainage through a body produced according to the invention may be increased/adapted by introducing one or more drainage channels 150, 250. In FIG. 15 there is shown the position of the two mould halves 100, 200 during the heat press forming action. As can be seen in FIG. 16, which is a cross sectional zooming of FIG. 15, the upper drainage channel 150 ends where the surface layer 130 meets the forming space 300 and the lower drainage channel 250 ends between surface layer 230 and the first support layer 220. Thanks to the flexibility in accordance with the invention the drainage channels 150, 250 can have its pointed ending substantially anywhere within the body 100, 200.

Finally, as is evident from FIGS. 14 and 15 that all the area forming the surface layer 130, 230 is arranged with fine particles 131, 231. However, all parts of that surface area are not needed to be permeable. As a consequence, some portions of those surfaces 160, 260 may be treated to have a permeability that is substantially smaller than the other portions of the surface layers 130, 230, e.g. by applying a thin impermeable layer 161, 261 (e.g. paint) having appropriate properties or by workshop machining techniques.

As is evident for the skilled person in the field, the above examples show that the invention provides for production of a large variety of different three dimensional products in a flexible and cost-efficient manner.

Figure 11:
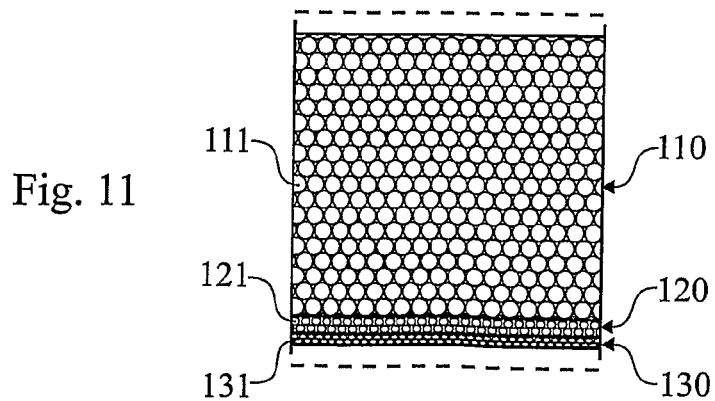
FIG. 11 is a cross sectional zooming of the embodiment shown in FIG. 10.

As mentioned above the process steps for forming the first layers 120, 130 may be the same for the production of a filter body 100 (as shown in FIGS. 1-13) as for a pulp mould 100 (as shown in FIG. 14). However, when producing a pulp mould, having a homogeneous body with channels 150, 250 the production includes further steps after having formed the outer layers 120, 130. First, in the next stage pointed elongated elements, e.g. nails (which preferably have a slightly conical shape) are arranged on top of the first support layer 120. These objects will form the enlarged drainage passages 150 in the basic body 100, to facilitate an enhanced drainage of fluid. Thereafter the particles 111, forming the base structure 110, are poured into the basic mould 400 forming the basic body 110 of the pulp mould, on the top of the other layers 130, 120. Preferably the bottom surface 140 of the pulp mould, i.e. the surface that is directed upwardly in FIG. 11, is evened out before the entire basic mould 400 is introduced into the sintering furnace; wherein the sintering is accomplished in accordance with conventional know how. After cooling, the sintered body 100 is thereafter taken out of the basic mould 400 and the sharp pointed objects taken out from the body, which is especially easy if these are conical. (It may be preferred to apply the "nails" to a plate, which allows for introduction and removal of the "nails" in an efficient manner). Finally the rear surface 140 of the body 100 may be machined in order to obtain a totally flat supporting surface.

The invention is not limited by what is described above but may be varied within the scope of the appended claims. For instance, it is evident that the surface layer 130 applied within the basic mould 400 may also be configured generally along the principles as shown in FIG. 12, i.e. merely adhering particles to a limited surface area. Hence merely a portion of the forming surface 402 of the basic mould 400 may be applied with the adhering laying 604, e.g. by using a template to cover desired parts of the surface 402 when applying the adhering layer/s 604. In this manner it is possible to tailor the outer surface layer 130 (and indeed of course any other layers) in any desired way. Moreover it is to be understood that the definition surface layer, or indeed the definition layer, must be interpreted broadly. It is evident that even though the figures show that the surface layer 130 merely contains exactly one layer/level of fine particles 131, this is a schematic view of how it possible may be done, but in reality there is rarely a need to have such exactness. Hence, normally there may exist some variation of how many "levels" there are in a layer, e.g. including some portions of a layer/s 130 including particles 131 positioned on top of each other. Moreover, in many situations there may be an advantage that the surface layer 130 (or indeed any other layer) includes a number of particles fixed on top of each other within that layer. Accordingly the invention has to be interpreted in sufficiently broad manner to also cover an embodiment where the further layer that is defined before step e) may include the same kind of particles as the particles in the surface layer, e.g. supplied in one batch into the mould 400, which form both the surface layer 130 and the further layer on top of that surface layer 130 (needed to establish a sintered body). Further it is evident that the invention is not restricted to the use of water containing liquids to adhere the particles, but that many different kind of liquids or indeed pastes may be used in accordance with the invention. This may for example be achieved by applying a thin sticky layer (e.g. wax, starch, organic glue, etc.) on to the basic mould, e.g. by means of spray or by applying it with a cloth or dipping the basic mould into it. Further it is realised that parameters of the environments (e.g. a different temp.) do have an influence on what kind of liquids/pastes may be most appropriate to use.

Of course the configuration of the product 100 may vary within wide frames depending on desired needs and hence it is evident that the shapes of the shown embodiments are by means of example only. The shape of the particles may also vary within wide frames depending on desired needs, e.g. spherical, irregular and/or elongated. The material of the powder particles may also be chosen within a wide range, for example to be mainly ceramic, intermetallic or metallic, e.g. copper, bronze and other copper based alloys, nickel based alloys (e.g. Inconel 600, Monel 400, Hastelloy X, etc) titanium, stainless steel etc.

The invention claimed is:

1. A method for forming a three dimensional sintered body comprising the steps of:
    a) providing a basic mould having a configuration adapted to the sintered body that is to be produced;
    b) treating the surface of the basic mould with an adhering layer to facilitate application of a first surface layer of the sintered body;
    c) applying particles onto the basic mould, to form said first surface layer, wherein at least a portion of the adhering layer melts from the heat supplied by the particles and, before step e), the portion of the adhering layer that melted is frozen again;
    d) applying at least one more layer of particles on top of said first surface layer; and
    e) sintering the particles of said first surface layer and said at least one more layer on the basic mould to form the sintered body.

2. Method according to claim 1, wherein said adhering layer is applied as a liquid.

3. Method according to claim 2, wherein said adhering layer is applied to the basic mould by means of spraying.

4. Method according to claim 2, wherein said particles are adhered by means of solidification of said liquid.

5. Method according to claim 1, wherein prior to step b) the basic mould has been treated to obtain a temperature of between 0° C. to −100° C.

6. Method according to claim 1, wherein prior to step b) the basic mould has been treated to obtain a temperature of between −10° C. to −30° C.

7. Method according to claim 5, wherein step c) is performed in a room having a temperature above +10° C. and below 60° C.

8. Method according to claim 5, wherein step c) is performed in a room having a temperature between 15° C. to 35° C.

9. Method according to claim 5, wherein step c) is performed in a room having a temperature between 18° C. to 28° C.

10. Method according to claim 1, wherein at least a portion of the one more layer of particles is applied by means of a second adhering layer, on top of said first surface layer.

11. Method according to claim 1, wherein at least one portion and/or at least one layer comprises particles of different size than other particles in other parts said body.

12. Method according to claim 1, wherein at least one portion and/or at least one layer comprises particles of larger size than the particles in at least a portion of said surface layer.

13. Method according to claim 1, wherein at least one layer comprises powder particles.

14. Method according to claim 1, wherein at least one layer comprises particles made of fibers.

15. Method according to claim 1, wherein at least one channel is provided in the body by applying a solid device that is removed from the body after step d).

16. Method according to claim 1, wherein step b) is also applied to surfaces of the basic mould adapted for substantially non-permeable areas of the body.

17. Method according to claim 1, wherein in step b) the adhering layer applied to the basic mould is applied as a liquid and is frozen due to the temperature of the basic mould.

18. Method according to claim 1, wherein in step c) the adhering layer is frozen again due to the temperature of the basic mould.

* * * * *